Figure 1:
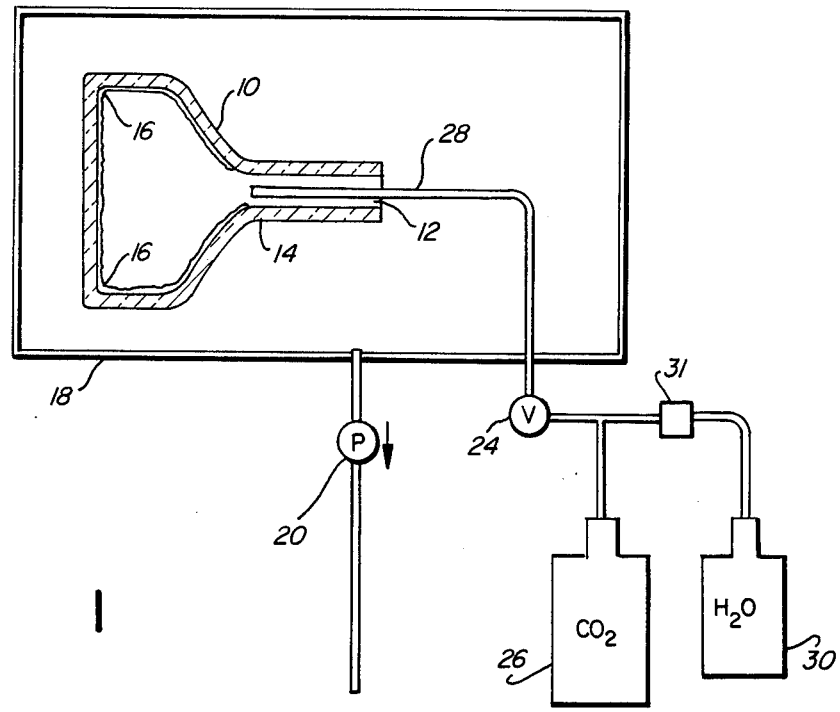

United States Patent [19]

Madden et al.

[11] 4,048,545

[45] Sept. 13, 1977

[54] CATHODE RAY TUBE PROCESSING

[75] Inventors: Thomas Harry Madden, Euclid; Clair Wilbur Reash, Fairview Park, both of Ohio

[73] Assignee: Union Carbide Corporation, New York, N.Y.

[21] Appl. No.: 744,819

[22] Filed: Nov. 24, 1976

[51] Int. Cl.$^2$ .............................................. H01J 9/50
[52] U.S. Cl. .......................................... 316/2; 316/25
[58] Field of Search ................................. 316/2, 24, 24

[56] References Cited

U.S. PATENT DOCUMENTS 3,063,777  11/1962  Trax .......................................... 316/2
3,712,699  1/1973  Syster ....................................... 316/2

Primary Examiner—Richard B. Lazarus
Attorney, Agent, or Firm—Frederick J. McCarthy, Jr.

[57] ABSTRACT

A method for treating and gettering a reworked television picture tube using $CO_2$ and water vapor which avoids the development of deleterious high pressures upon the regettering thereof.

2 Claims, 2 Drawing Figures

CATHODE RAY TUBE PROCESSING

The present invention is directed to the processing of television picture tubes. More particularly the present invention is directed to the processing of television picture tubes which have been previously gettered by flashing of a barium getter therein but which have been reworked and require a further gettering.

In the manufacture of television picture tubes the necessary vacuum is obtained through the use of getters, barium getters, whereby barium is flashed or vaporized within the picture tube. The vaporized getter material, e.g., barium sorbs and reacts with the residual gases in the picture tube and removes them as low vapor pressure solid condensates. Also, the barium which is deposited, as a film on the interior surfaces of the picture tube, continues to sorb gases which may be liberated during use of the picture tube.

In the normal manufacturing of color TV picture tubes, approximately ten percent are required to be reworked by opening the neck portion of the picture tube and removing the electron gun and replacing it with a new one. Since the picture tube has been completely processed, including flashing the barium getter, when the original gun is removed, e.g., by cracking the neck glass, the barium film from the getter flash becomes oxidized and reacts with moisture to form stable hydrates. The waters of hydration are not removed by the normal exhaust bakeout at approximately 400° C which precedes the flashing of a second getter in the reworked picture tube. However, it is possible during the flashing of the second getter on the replacement gun to attain temperatures sufficient to decompose the hydrates. The moisture so released can react with metal carbide already present in the tube to produce hydrocarbon gases. These gases can produce relatively high pressures in the tube, and cause rejection for high gas readings, or upon high voltage scanning can become ionized and be accelerated onto the cathode to cause "ion burn" and/or carbon deposition. This so-called ion burn can reduce the cathode electron emission either by direct mechanical bombardment or by depositing a layer of carbon (from the decomposed hydrocarbon gases) on the cathode-emitting surface. While it has been known that previously gettered picture tubes which have been opened and stored for several days have a somewhat reduced tendency to release moisture, up to the present there has not been a satisfactory commercial method to avoid excessive moisture release during the second or subsequent getter flash.

Figure 2:
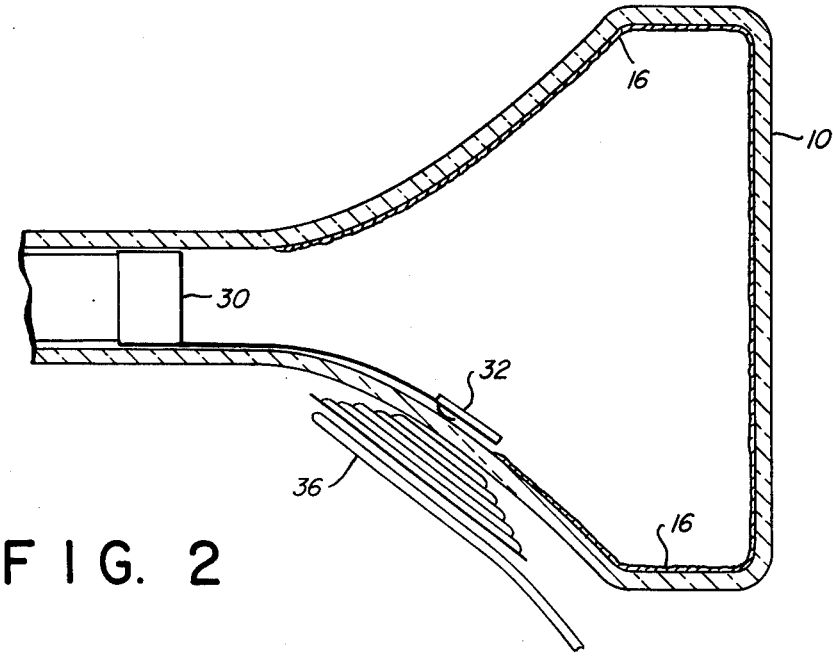

It is therefore an object of the present invention to provide a method for treating and gettering a reworked television picture tube which avoids the development of deleterious high pressures upon the regettering thereof. Other objects will be apparent from the following description and claims in conjunction with the drawing wherein FIG. 1 shows somewhat schematically, an arrangement for the practice of the present invention and FIG. 2 shows a previously gettered picture tube for use with the present invention.

In accordance with the present invention a method is provided for treating and gettering a picture tube which has been previously gettered by the flashing of a barium-containing material therein and which as a result of said flashing has a barium film on portions of its internal surface, said method comprising:

i. converting said barium film to barium carbonate by contacting the barium film on the inner surface of said previously gettered picture tube with a gas mixture consisting essentially of $CO_2$ and water vapor, said gas mixture being at least about 10% by volume of $CO_2$ and said water vapor being in an amount of at least about 1% of the volume of $CO_2$, but less than the amount which corresponds to the dew point of water vapor in said mixture.

ii. subsequently evacuating said picture tube to a pre-gettering flash vacuum and iii. gettering said picture tube by flashing a barium-containing getter therein.

The present invention will be more fully understood with reference to the drawing which:

FIG. 1 shows a previously gettered television picture tube with an arrangement for treating the said picture tube prior to a second gettering.

With reference to FIG. 1, a previously gettered television picture tube 10 is indicated which has been opened at portion 12 of neck section 14, e.g., by cracking or drilling in accordance with techniques known to the art. A film of barium, resulting from previous gettering by the flashing of a barium getter in tube 10 is indicated at 16. Such films are ordinarily on the order of 0 to 10 microns thick. Tube 10 is arranged within a chamber 18 which can be evacuated by vacuum pump 20 so that tube 10 is essentially free of gas, e.g., at a pressure of less than about $10^{-3}$ Torr. Under such conditions, valve 24 is opened and $CO_2$ gas from vessel 26 enters tube 10 via conduit 28 together with water vapor from vessel 30, the ratio of water vapor pressure should be sufficient to hydrate a portion of the barium film, e.g., should be at least about 1% of the volume of $CO_2$ and should not reach an amount which corresponds to the dew point of the gas mixture, i.e., it is important to avoid condensation of water in tube 10 during processing. The appropriate amount of water vapor can be controlled by meter 31. The vessel 30 can be any water vapor source which will permit the water vapor entering the tube to be controlled within these limits. Examples are a steam generator or a container of liquid water through which $CO_2$ is bubbled. With tube 10 filled with a $CO_2$-water vapor mixture, suitably at standard conditions of temperature and pressure, a reaction occurs between the barium film 16 and the gas mixture which converts the barium film 16 to barium carbonate. This reaction proceeds rapidly and under the above-described conditions the barium film 16 is converted to barium carbonate in from about 1–15 minutes, and $H_2O$ from the barium hydroxide hydrates is removed as the barium compounds are converted to the carbonate.

In an alternate technique, chamber 18 is at approximately atmospheric pressure and temperature conditions while $CO_2$ and $H_2O$ vapors are continuously passed passed through conduit 28 into tube 10, pump 20 being used as an exhaust pump to withdraw the atmospheric gases displaced by the $CO_2$- $H_2O$ vapor mixture and unreacted $CO_2$ and $H_2O$. As in the first described technique, the barium film 16 is rapidly converted to barium carbonate.

With the initial barium film 16 converted to barium carbonate, and with reference to FIG. 2, previously gettered tube 10 is provided with an electron gun 30 and a barium getter 32, and the tube 10 is resealed, pumped down to a pre-flash vacuum typically about $10^{-5}$ Torr, and regettered by the flashing of getter 32, e.g., by means of coil 36 by techniques known to the art, such as disclosed in U.S. Pat. No. 3,816,788. Due to the previous conversion of barium film 16 to barium carbonate, in the manner hereinabove described, the second getter flashing does not cause decomposition of the converted film 16 and deleterious gas pressures in tube 10 after flashing are avoided.

In an alternate method, an appropriate amount of water vapor can first be provided in tube 10 followed by the introduction of $CO_2$, or vice versa, to provide the required gas mixture in tube 10.

In the practice of the present invention, the preferred gas mixture is $CO_2$ - water vapor mixture with a water vapor content of about 1 to 5% by volume. The mixture can include up to 92% by volume of other gases which are essentially non-reactive with water vapor or $CO_2$ such as the atmospheric gases, $N_2$, Ar, rare gases. However, the reaction time required to convert the initial barium film to barium carbonate increases as the amount of $CO_2$ in the gas mixture is decreased. The gas mixture is suitably at about room temperature and pressure conditions but can be widely varied as long as sufficient $CO_2$ gas contacts the barium film to convert the film to barium carbonate.

Essential features of the present invention are the presence of $CO_2$ with water vapor in contact with a barium film and the absence of water vapor condensation; also, sufficient contact between the gas mixture and barium film is required to convert the film to barium carbonate; a commercial picture tube filled with $CO_2$ - water vapor mixture as described above for about 1 – 15 minutes, preferably 10 minutes, is adequate.

By way of example, a 25 inches diagonal screen television picture tube having a barium film provided by flashing a 250 mg. barium getter as described in the aforementioned U.S. Pat. No. 3,816,788 can be opened to the atmosphere and thereafter filled with a $CO_2$ - water vapor mixture (97% $CO_2$, 3% $H_2O$) at STP for about 10 minutes to provide conversion of the film to barium carbonate. Upon reflashing with the same type getter the pressure in the picture tube after flashing would not exceed about $10^{-6}$ Torr.

The use of dry $CO_2$, i.e., in the absence of water vapor, instead of the above-noted mixture would not convert the previous barium film to barium carbonate and reflashing would result in picture tube pressures of about $10^{-5}$ Torr and higher which would very detrimentally affect tube performance.

We claim:

1. Method for treating and gettering a picture tube which has been previously gettered by flashing of a barium-containing material therein and which as a result of said flashing has a barium film on portions of its internal surface, said method comprising:
   i. converting said barium film to barium carbonate by contacting the barium film on the inner surface of said previously gettered picture tube with a gas mixture consisting essentially of $CO_2$ and water vapor said gas mixture being at least about 10% by volume of $CO_2$ and said water vapor being in an amount of at least about 1% of the volume of $CO_2$ but less than the amount which corresponds to the dew point of water vapor in said mixture,
   ii. subsequently evacuating said picture tube to a pre-gettering vacuum and
   iii. gettering said picture tube by flashing a barium-containing getter therein.

2. A method of accordance with claim 1 wherein said gas mixture consists essentially of $CO_2$ and water vapor.